UNITED STATES PATENT OFFICE.

RUDOLF NIETZKI, OF BASLE, SWITZERLAND, ASSIGNOR TO THE FARBWERKE, VORMALS MEISTER, LUCIUS & BRÜNING, OF HOCHST-ON-THE-MAIN, GERMANY.

BROWN CARBON DYE.

SPECIFICATION forming part of Letters Patent No. 424,019, dated March 25, 1890.

Application filed October 9, 1888. Serial No. 287,689. (Specimens.) Patented in Germany November 16, 1887, No. 44,170; in France December 12, 1887, No. 187,821, and in England December 21, 1887, No. 17,583.

*To all whom it may concern:*

Be it known that I, RUDOLF NIETZKI, doctor of philosophy, a citizen of Germany, residing at Basle, county of Baselhart, Switzerland, have invented certain new and useful Improvements in Coloring-Matters; and I do hereby declare the following to be a full, clear, and exact description of the invention, such as will enable others skilled in the art to which it appertains to make and use the same.

My invention relates to a new and useful improvement in the production of azo coloring-matters—such as give in chrome mordants shades which resist fulling and light quite as well as the alizarine coloring-matters—by the action of nitro-diazo compounds upon ortho-oxy-carbonic acids.

The said improvement was patented in foreign countries, as follows: Germany, No. 44,170, November 16, 1887; Great Britain, No. 17,583, December 21, 1887; France, No. 187,821, December 12, 1887.

Hitherto dyers and printers have sought in vain for yellow and brown coloring-matters having the qualities just mentioned, and now this want may be fully satisfied, as I have discovered that a yellow coloring-matter having the qualities desired may be produced by combining metanitro-diazo-benzol with salicylic acid.

The coloring-matters already known which result from the combination of the diazo compounds of the paranitraniline with salicylic acid give a dirty reddish-brown color, not at all fast; hence such do not satisfy the wants of the dyer and printer.

Besides the coloring-matter above mentioned, I have discovered that fast coloring-matters of suitable shades may be produced by combining, for instance, the diazo compounds of metanitraniline, metanitro-para-toluidine, metanitro-ortho-toluidine, paranitro-ortho-toluidine, orthonitro-paratoluidine with ortho-oxy-carbonic acids, such as salicylic acid, orthoresotinic acid, metaresotinic acid, pararesotinic acid, or alpha-oxynaphoic acid.

In producing my coloring-matters I proceed as follows: One molecule of a nitraniline—as, for example, one hundred and thirty-eight kilograms of metanitraniline—is diazotized in the usual manner and then caused to act upon one molecule of an ortho-oxy-carbonic acid—as, for example, one hundred and thirty-eight kilograms of salicylic acid—dissolved in five hundred kilograms of water and eighty kilograms of caustic soda. After standing for four hours the liquid which contains the coloring-matter is heated, filtered, and the coloring-matter precipitated by the addition of common salt. The shades of the coloring-matter obtained in this way lie between yellow and brown.

The coloring-matters have the formula $CnH_2n-8(NO_2)N_2CnH_2n-9(OH)(COOH).$ They are insoluble in water and dilute acids, readily soluble in alcohol, ether, and dilute alkalies. When reduced with stannous chloride and hydrochloric acid, ($SnCl_2$ and $HCl$,) they split up into the amido-oxy-carbonic acids of the formula $CnH_2n-9(NH_2)(OH)(COOH,)$ which are easily to be recognized, and the diamines of the formula $CnH_2n-8(NH)_2$, also easily recognized and identified.

The alkaline salts of the coloring-matters are readily soluble in hot water, but not so readily in cold water. By common salt they may be precipitated from the solution. The calcium salts are with difficulty soluble in hot water. The barium salts are almost insoluble. A solution of the sodium salts is precipitated by the following-named bodies, showing colors named: ferric chloride, black-brown; copper-vitriol, yellow-brown; acetate of lead, orange; sulphate of chrome, yellow.

In concentrated sulphuric acid the coloring-matters dissolve with yellow color and are precipitated from this solution with water.

The colors are characterized by their great fastness on chrome and nickel mordants. It is not possible to remove these colors from chrome-mordanted wool dyed with them, even by applying a soap solution of two per cent. for twenty-four hours or by submitting the wool to the fulling process. It may be further said that when wool is dyed with these colors and exposed for four weeks to the direct influence of sunlight the tints remain almost unchanged.

I do not claim as my invention the combination of paranitro-diazo-benzol with salicylic acid, as this combination is of previous origin.

Having thus described my invention, what I claim as new, and desire to secure by Letters Patent, is—

Yellowish-brown coloring-matter of the formula $CnH_2n - 8(NO_2)N_2CnH_2n - 9(OH)(COOH)$, produced by condensing a nitro-diazo body with an ortho-oxy-carbonic acid, as described, insoluble in water and dilute acids, readily soluble in alcohol, ether, and diluted alkalies, as set forth.

In testimony whereof I affix my signature in presence of two witnesses.

RUDOLF NIETZKI.

Witnesses:
GEORGE GIFFORD,
JOSEPH REVERDY.